Nov. 24, 1942.　　　　J. DUSEVOIR　　　　2,303,032
COUPLING
Filed July 31, 1941　　　　2 Sheets-Sheet 1
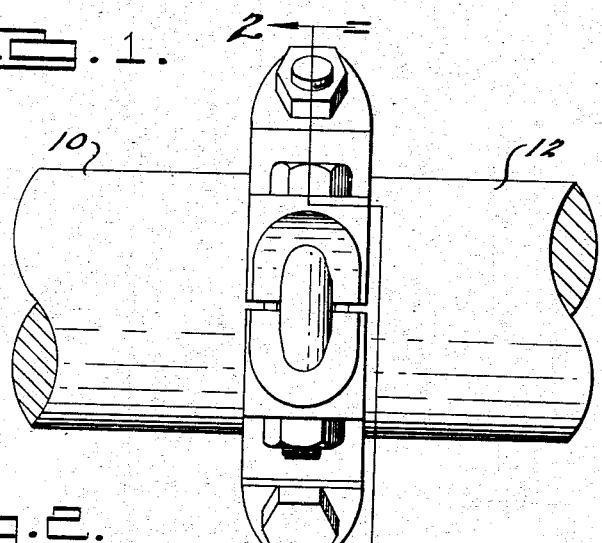
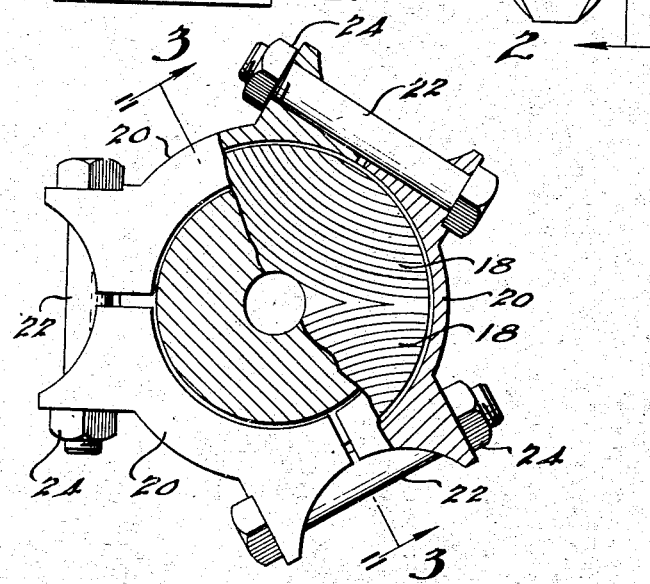
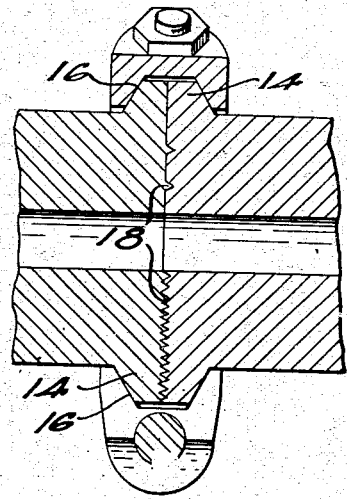
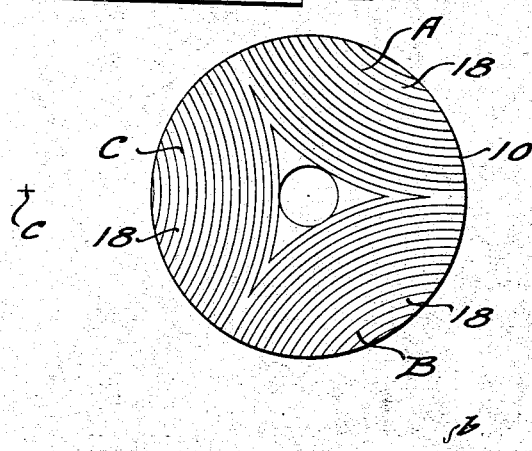
INVENTOR
Julius Dusevoir.
BY Harness, Dickey & Pierce
ATTORNEYS Nov. 24, 1942.   J. DUSEVOIR   2,303,032
COUPLING
Filed July 31, 1941   2 Sheets-Sheet 2
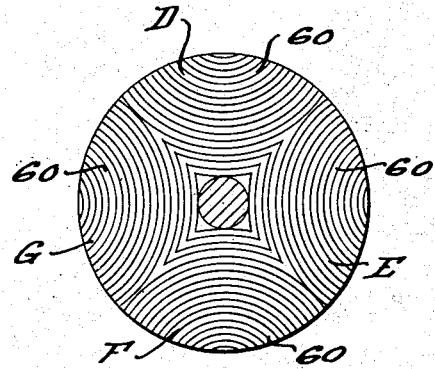
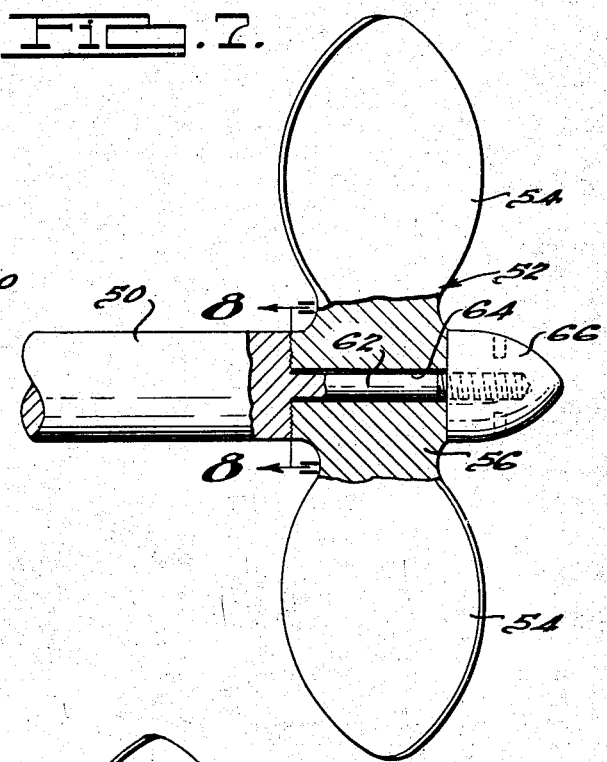
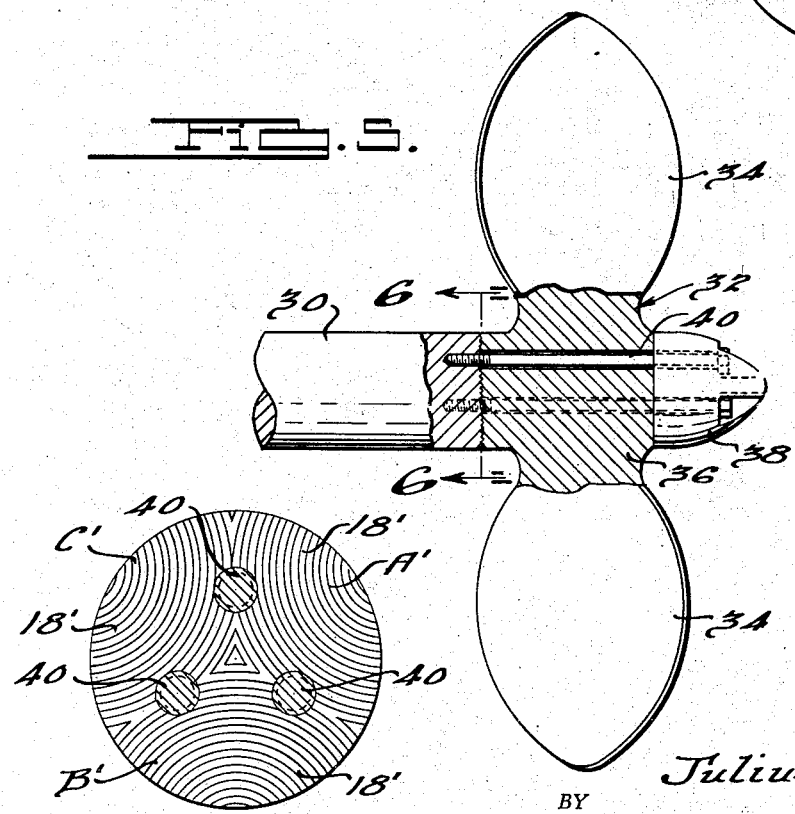
INVENTOR
Julius Dusevoir.
BY Harness, Dickey & Pierce.
ATTORNEYS.

Patented Nov. 24, 1942

2,303,032

UNITED STATES PATENT OFFICE 2,303,032

COUPLING

Julius Dusevoir, Dearborn, Mich., assignor to Century Motors Corporation, Dearborn, Mich., a corporation of Michigan Application July 31, 1941, Serial No. 404,755

5 Claims. (Cl. 287—113)

This invention relates to separable couplings for rotating elements, and has for its principal object the provision of such coupling that is capable of transmitting a maximum amount of torque in a coupling of minimum diameter.

Objects of the invention include the provisions of a coupling for joining a pair of rotating elements that eliminates the use of bolts or like connecting means subjected to shearing stresses in the transmission of torque between the elements; the provision of a coupling for joining a pair of rotatable elements together that utilizes substantially the entire opposing end faces of the elements to transmit the torque load between them; the provisions of a coupling for joining a pair of rotatable elements that automatically maintain its axial alignment; the provision of a coupling for use between a pair of rotatable elements that embodies the maximum amount of strength in a minimum diameter; the provision of a two-part coupling the opposing faces of which are provided with a plurality of groups of complementary serrations thereon with the serrations of each group disposed at an angle to the serrations of other groups, whereby when the serrations of both of the elements are arranged in complementary relationship the two elements are locked together against lateral displacement in any direction with respect to each other; and the provision of a coupling for rotating elements, as above described, that is simple in construction, efficient in operation and economical to produce.

The above being among the objects of the present invention, the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views:

Figure 1 is a fragmentary, side elevational view of a pair of rotatable shafts coupled together in accordance with the present invention;

Fig. 2 is a transverse sectional view taken on the line 2—2 of Fig. 1;

Fig. 3 is a fragmentary, sectional view taken axially through the joint shown in Figs. 1 and 2 and as on the line 3—3 of Fig. 2;

Fig. 4 is an end elevational view of one of the shafts shown in the preceding views illustrating the serrations therein provided for the purposes of the coupling of the present invention;

Fig. 5 is a fragmentary, partially sectioned, side elevational view showing a propeller secured to the end of a propeller shaft by a coupling formed in accordance with the present invention;

Fig. 6 is an enlarged transverse sectional view taken on the line 6—6 of Fig. 5 and illustrating the co-operating end of the propeller shaft in end elevation;

Fig. 7 is a view similar to Fig. 5 but illustrating a modified form of coupling arrangement; and Fig. 8 is an enlarged transverse sectional view taken on the line 8—8 of Fig. 7 and illustrating serrated end of the propeller shaft in end elevation.

The coupling of the present invention may be employed to drivingly connect any rotatable pair of elements having a common axis of rotation, and by its use substantially the entire area of the co-operating end faces of the two elements may be employed for resisting relative rotation between the elements and, where properly constructed as to the angularity of the side faces of the serrations, eliminates the need of placing connecting devices such as bolts or the like under shearing stresses in the transmission of torque between the elements. In this respect, the invention is similar to the coupling disclosed in my United States Patent No. 2,013,039, issued September 3, 1935, on Crankshaft, the difference of the present invention as compared to the coupling shown in my above identified patent being that in the present case the co-operating serrations are so constructed and arranged that when in proper complementary relation they positively prohibit, in and of themselves, radial displacement of one element with respect to the other in any direction, as well as further to prohibit relative rotation between these two elements. This difference in effect is obtained in the present invention by arranging the serrations in a plurality of groups, the serrations of each group preferably extending transversely with respect to lines radial to the axis of rotation of the two elements and generally arranged at different angles to serrations of other groups in the coupling. In other words, in my prior art patent above identified, the co-operating serrations between the associated parts were curved and all struck about the same center and, accordingly, with such construction, when the two parts of the coupling are free of means maintaining them in axial alignment, the two parts may be displaced radially with respect to each other along the arc of the curved serrations.

The serrations, in accordance with the present invention, may be made either straight or curved, but are arranged in groups of two or more with the serrations of each group arranged generally transversely with respect to lines radial of the axis of rotation of the joint and with the serrations of each group, or parts of such serrations, at an angle to the serrations, or parts of the serrations, of other groups. By so arranging the serrations, the serrations of opposed groups on the two elements, when in complementary engagement, not only lock the two elements together for equal rotation but also positively lock the co-operating ends of the elements against lateral displacement in any direction with respect to each other as long as two elements are maintained against axial separation.

Where the sides of the serrations are parallel to the axis of rotation of the coupling, or at an angle with respect thereto less than the angle of friction between the two elements of the coupling, then all that is required in addition to the serrations to maintain the operativeness of the coupling is some means to prevent axial separation of the two parts of the coupling. Where the side faces of the various serrations exceed the angle of friction of the material from which they are formed, then, of course, some means must be provided for maintaining the two parts of the coupling against axial separation under the reaction between co-operating faces of the serrations on the two elements resulting from the transmission of torque between the two elements. As a manner of illustration only, in the accompanying drawings serrations of the last described type are shown.

The number of groups of serrations in a coupling, in accordance with the present invention, is more or less immaterial as long as there are two or more groups, and, likewise, whether the serrations are straight or of uniform or irregular curvature is more or less unimportant as long as the serrations of each group extend generally in a direction transverse to lines radial of the axis of rotation of the coupling and at least parts of the serrations of one group are disposed at an angle with respect to at least parts of the serrations of another group. However, I have found it generally desirable to use serrations of a curved nature with the serrations of each group struck from a common center, and where three of such groups are employed, then it is possible to substantially completely fill the opposing faces of the two elements of the coupling with serrations, thereby to utilize substantially the entire areas of such surfaces in resisting relative movement of one of the elements with respect to the other thereof either in the transmission of torque, under bending loads or the like. Accordingly, in the preferred embodiment of the invention as disclosed in the accompanying drawings the two elements of the coupling are illustrated as having three groups of serrations and one embodiment is illustrated as having four groups.

It will be appreciated that the present invention may be utilized in joining rotating elements of any type or character as long as they have a common axis of rotation. For the purpose of simplicity of description, however, in the drawings I have shown two shafts connected together in the preferred embodiment and, in order to illustrate a different application, I have shown a marine propeller secured to a propeller shaft by means of the couplings of the present invention.

It will also be appreciated that in the practice of the present invention any suitable means may be employed for securing the two rotatable elements against axial separation, the particular means shown by way of illustration being simply indicative of one way that this may be satisfactorily accomplished.

Referring now to the accompanying drawings, and particularly to Figs. 1 to 4 inclusive, the two elements there shown connected together are, for the purpose of illustration, shown as concentric cylindrical shafts 10 and 12, having co-operating abutting faces arranged generally in a plane perpendicular to the axes of the shafts. Each shaft 10 and 12 is formed to provide a relative shallow, radially directed, annular flange 14 at that end thereof cooperating with the opposed end of the other of said shafts and such flanges are provided with beveled axially directed faces 16 as best indicated in Fig. 3. In accordance with the present invention, the opposed faces of the abutting ends of the shafts 10 and 12, as well as flanges 14, are provided with inter-engaging and complemental serrations 18. In accordance with the present invention, the serrations 18 are arranged in three groups, best shown in Fig. 4, and there lettered as A, B and C, respectively. As previously explained, the serrations, or at least portions of the serrations of each group should, in accordance with the present invention, be arranged generally transversely of lines radial to the shafts on which they are formed and disposed at angles to the serrations or parts of serrations of other groups. While such serrations may be either straight or curved, as previously explained, particularly where three groups are employed as in the construction shown in Figs. 1 to 4, inclusive, I prefer to employ curved serrations and in the particular construction shown. The serrations of group A are all struck about the center $a$, the serrations of group B about the center $b$, and the serrations of group C about the center $c$. Centers $a$, $b$ and $c$ are, of course, equally angularly spaced from each other about the axes of the shafts 10 and 12, and the radii of curvature of the serrations 18 are preferably small enough so that substantially the entire end faces of the shafts 10 and 12 and their co-operating flanges 14 are serrated, as indicated in Fig. 4. The serrations 18 on the end of one shaft are, of course, so arranged as to be complementary to the serrations on the other of the shafts so that they interfit one with the other, as indicated in Fig. 3, when the two shafts are arranged in concentric and abutting relationship. It will, of course, be appreciated that where the serrations of the group A, for instance, are identical to and are identically arranged with the serrations of groups B and C, particularly with relation to the center of the shafts, then the two shafts 10 and 12 may be joined together with the serrations in interfitting relationship in any one of three different positions, but where this is not true, then the shafts can be joined together only in one position of rotation with respect to the other. In any event, when the two shafts are joined together in axially abutting relationship, as is particularly brought in Fig. 3, the interfitting serrations 18 on both shafts utilize substantially the entire end faces of the shafts to resist relative rotation of the shafts. The serrations of the various groups being disposed transversely with respect to lines radially of the shafts, and the serrations of one group being disposed at an angle to the serrations of the other group, it will be appreciated that when the serrations are in interfitting relationship the shafts 10 and 12 must be arranged concentrically and the interfitting serrations positively prevent any possible radial displacement of one shaft in any direction with respect to the axis of the other shaft. This is the principal feature of difference between the present invention and that disclosed in my prior United States patent above identified.

Inasmuch as the interfitting serrations serve to transmit the torque between the shafts 10 and 12, all that is necessary is to maintain the two shafts against axial separation in order to render the serrations effective in transmitting torque. While, as previously mentioned, any suitable or conventional means may be provided for maintaining the shafts 10 and 12 against axial separation, in the particular construction shown where the shafts are provided with the shallow annular flanges 14 having beveled outer faces 16, a three-part clamping device, such as illustrated in the drawings is preferably employed. Such clamping device consists of three parts 20 combining to substantially encircle the abutting flanges 14, together with tangentially directed bolts 22 between adjacent ends of adjacent members 20 and cooperating nuts 24. The members 20 as thus illustrated in Fig. 3 are interiorly grooved in conformance with the contour of the combined flanges 14 so that when drawn together by the bolts 22 and nuts 24 they cooperate with the bevel faces 16 to secure ends of the shafts 10 and 12 rigidly together.

In Figs. 5 and 6 in order to illustrate a different adaptation of the present invention and a different method of maintaining the two rotatable elements against axial separation the coupling of the present invention is shown applied between a marine propeller and its propeller shaft. The shaft is herein indicated at 30 and is of course a cylindrical shaft. The propeller is indicated generally as 32 and as having a pair of diametrically opposed blades 34 and a hub 36. The rear end of the shaft 30 and the forward face of the hub 36 lie in planes perpendicular to their respective axes of rotation and, as best indicated in Fig. 6 which is an end elevation of the rear end of the shaft 30, the rear end of the shaft 30 and the forward face of the hub 36 are each provided with serrations 18' arranged in three equally angularly disposed groups A', B' and C'.

The serrations 18' are similar to the serrations 18 previously described, but in this case are struck on relatively shorter radii, but they are complementary and interfit with one another in the same manner as in the previously described constructions. In this case, in order to hold the hub 36 of the propeller 32 against axial separation from the shaft 30, a cap 38 is provided for the rear end of the propeller 32 and three equiangularly spaced bolts 40 passed through the cap 38 and hub 36 and thread into the rear end of the shaft 30. It will be appreciated that the bolts 40 need to be of sufficient strength to prevent axial separation of the propeller 32 and shaft 30 when the propeller shaft 30 is reversed in direction to back the cooperating bolt. During normal forward movement the thrust of the propeller itself would ordinarily be sufficient to maintain the serrated faces on the propeller and shaft in proper engagement so that under such conditions, the bolts 40 are subjected to substantially no stress whatever except the tensile stress initially applied in drawing up the parts together.

In Figs. 7 and 8 a slight modification of the constructions shown in Figs. 5 and 6 is illustrated. In this case the propeller shaft is indicated at 50, the propeller generally at 52 and as having blades 54 and hub 56. The opposed end faces of the shaft 50 and hub 56 are provided with serrations 60, as best illustrated in Fig. 8. In this case, however, instead of employing three groups of serrations, four groups D, E, F, and G are employed, the four groups being equi-angularly disposed with respect to each other about the axes of the shaft 50 and propeller 52. The serrations 60 in this case are arcuate in curvature and the serrations of each group struck from the same center and, of course, the serrations of opposed groups of the two faces interfit in the same general manner as in the previously described construction. In this case, in order to secure the propeller 52 against axial separation from the shaft 50, the shaft 50 is provided with an axially projecting stud 62, which may be formed separately from or integrally with the shaft 50, as desired, it being shown integral therewith for the purposes of illustration. The propeller 52 in this case is provided with an axial opening 64 in which the stud 62 is received, and a cap 66 threaded on the outer end of the stud 62 engages the rear face of the hub 56, thereby to maintain the propeller 52 and shaft 50 against axial separation. Obviously, the same benefits will result in this construction as in the construction illustrated in Figs. 5 and 6.

Formal changes may be made in the specific embodiments of the invention disclosed without departing from the substance and the spirit of the broad invention, the scope of which is commensurate with the appended claims.

What I claim is:

1. In a coupling for a pair of members having abutting surfaces adapted to be joined together and secured against displacement in all directions, means for positively preventing displacement between said abutting surfaces, said means comprising a multiplicity of interlocking serrations formed in the abutting surfaces of said members and being of such configuration that at least portions thereof would cross any straight line lying in the plane of said surfaces and passing through the center thereof whereby radial slippage and axial turning is prevented in all directions.

2. In a coupling for a pair of members having abutting surfaces adapted to be joined together and secured against displacement in all directions, means for positively preventing displacement between said abutting surfaces of said members, said means comprising a multiplicity of interlocking serrations formed in the abutting surfaces and being of uniform cross section from end to end and of such configuration that at least portions thereof would cross any straight line lying in the plane of said surfaces and passing through the center thereof whereby radial slippage and axial turning is prevented in all directions.

3. In a coupling for a pair of members having abutting surfaces adapted to be joined together and secured against displacement in all directions, means for positively preventing displacement between said abutting surfaces, said means comprising a plurality of groups of serrations disposed about the centers of said abutting surfaces, each of said groups including a multiplicity of interlocking serrations formed in the abutting surfaces of said members, and the configuration of said serrations and the arrangement of said groups being such that at least portions of said serrations will cross any straight line lying in the plane of said surfaces and passing through the center thereof, whereby radial slippage and axial turning is prevented in all directions.

4. In a coupling for a pair of members having abutting surfaces adapted to be joined together and secured against displacement in all directions, means for positively preventing displacement between said abutting surfaces, said means comprising a plurality of groups of serrations disposed about the centers of said abutting surfaces, each of said groups comprising a multiplicity of arcuately formed interlocking serrations of uniform cross section from end to end formed in the abutting surfaces of said members, and the configuration of said serrations and the arrangement of said groups being such that at least portions of said serrations will cross any straight line lying in the plane of said surfaces and passing through the center thereof, whereby radial slippage and axial turning is prevented in all directions.

5. In a coupling for a pair of members having abutting surfaces adapted to be joined together and secured against displacement in all directions, means for positively preventing displacement between said abutting surfaces, said means comprising a plurality of groups of serrations disposed about the centers of said abutting surfaces, each of said groups including a multiplicity of interlocking serrations formed in the abutting surfaces of said members, and the configuration of said serrations and the arrangement of said groups being such that at least portions of said serrations will cross any straight line lying in the plane of said surfaces and passing through the center thereof, whereby radial slippage and axial turning is prevented in all directions, each group being of substantially the same angular extent about the center of said surfaces, and the serrations of each group being struck from a common center eccentric to said centers of said abutting surfaces, and means maintaining said surfaces in abutting relationship.

JULIUS DUSEVOIR.